UNITED STATES PATENT OFFICE.

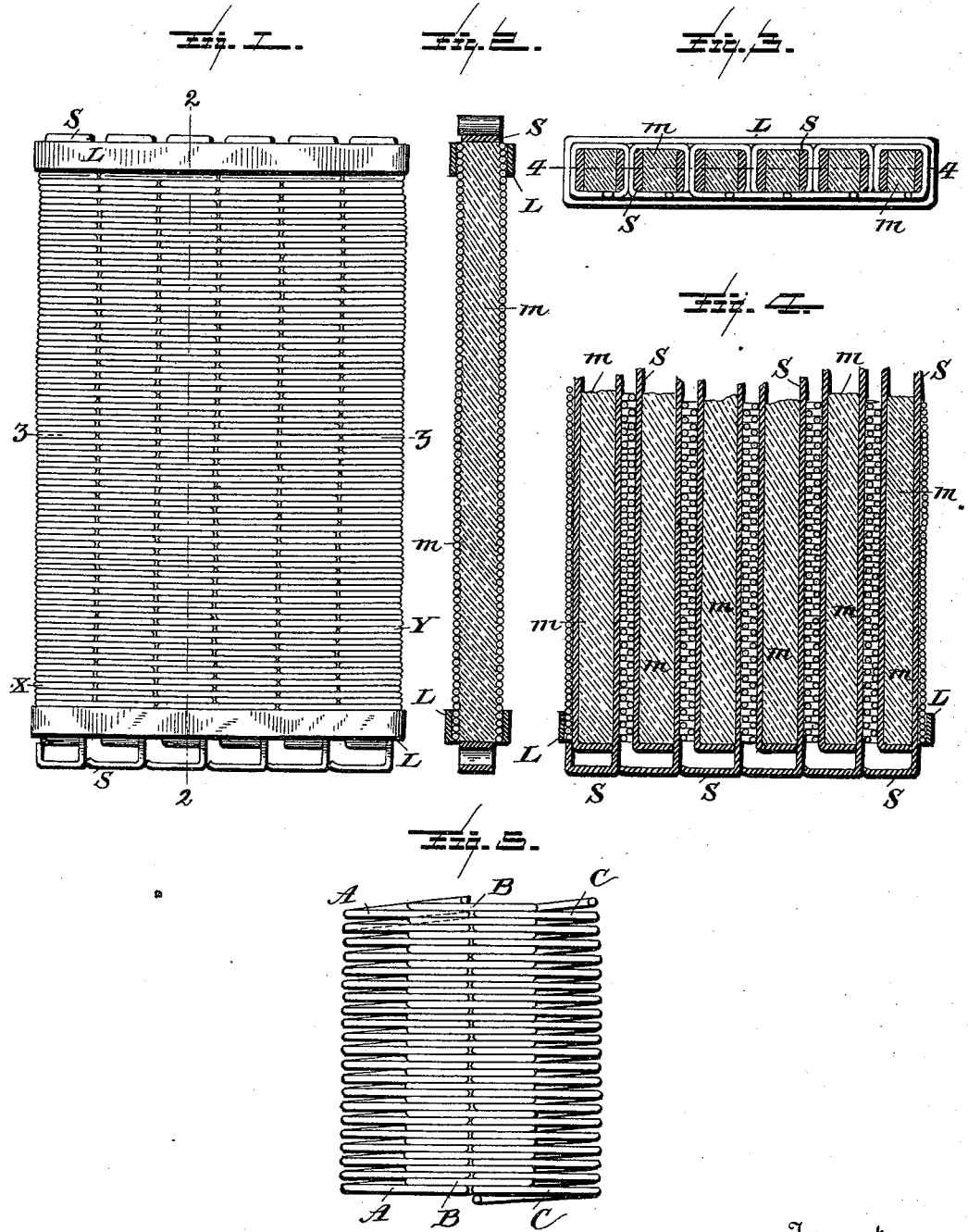

THOMAS P. WHITTIER, OF SAGINAW, MICHIGAN.

SECONDARY-BATTERY PLATE.

SPECIFICATION forming part of Letters Patent No. 436,050, dated September 9, 1890.

Application filed May 24, 1890. Serial No. 353,056. (No model.)

*To all whom it may concern:*

Be it known that I, THOMAS P. WHITTIER, of Saginaw, in the State of Michigan, have invented certain new and useful Improvements in Secondary-Battery Plates or Elements, of which the following is a specification.

The main object I have in view is the production of a secondary-battery plate or element which will not be liable to scale or disintegration and will not buckle or bend when in use, and which can be supplied and filled or packed with dry active material. To this end I form the plates of lead or other suitable wire intermeshed or interwoven in such manner as to afford free opportunity to the component parts for contraction and expansion without buckling, while forming also a series of tubes or boxes into which the active material can be placed or packed so as to be held most securely. I thus obtain a plate which while of much capacity is of relatively-small compass.

The nature of my invention can best be explained and understood by reference to the accompanying drawings, in which I have represented that embodiment of the invention which I now believe to be on the whole the best.

Figure 1 is a side elevation of a secondary-battery plate or element embodying my invention. Fig. 2 is a vertical section of the same on line 2 2, Fig. 1. Fig. 3 is a cross-section of the same on line 3 3, Fig. 1. Fig. 4 is a section on line 4 4, Fig. 3. Fig. 5 is a view representing a part of the plate unfinished and in process of construction, this being to show more clearly how the wires may be conveniently intermeshed or interwoven.

I have hereinbefore taken occasion to say, and now repeat, that the wire or wires (of lead or other suitable material) which form the body of the plate can be intermeshed or interwoven in a great variety of ways; and I wish it to be understood that I do not restrict myself to any particular method or pattern; but what I prefer and deem to be on the whole the best is illustrated in the drawings. I first form separate coils of the wire—such, for example, as the coils A B C in Fig. 5—by winding the wire spirally upon a mandrel of proper form, (in this instance a mandrel of rectangular cross-section,) the folds or turns of the wire being laid quite closely together. The mandrel, preferably, should be of a thickness equal to that required for the finished plate, less the thickness of the wire wrapped around it, and of a width equal to about that of two of the compartments or tubes with which the finished plate is to be provided. Removing the coil from the mandrel, I have a box or hollow pillar having the length and thickness of the finished plate and a width equal to that of two contiguous or adjoining compartments of said plate. Taking a number of these coils I intermesh or interweave them, as many as desired, in the manner indicated in Fig. 5—that is to say, taking coil B as the central coil I insert between its folds from one side the folds of coil A in such manner that the folds or turns of the one shall alternate with those of the other, and from the other side of the same coil B, I insert in a similar way the folds or turns of coil C. By this arrangement I obtain two central boxes or tubes composed the one of alternate folds or turns of the two coils B C, the other of alternate folds or turns of the two coils B A. By inserting additional coils in the same way between the folds of coils A and C the width of the plate can be increased indefinitely. In the plate shown in Fig. 1 there are five coils, such as A or B or C. In finishing the outer side compartments or boxes of the plate after it has reached the desired width ancillary coils of but half the width (or, in other words, of the width of a single box only) are used, the folds of these coils being inserted between and alternating with the projecting portions of the outer double-width coils. These smaller coils are seen at X Y in Fig. 1. In this way I obtain a plate made of intermeshed or interwoven wires or strips formed into a series of boxes or tubes and having free scope for expansion and contraction without thereby occasioning buckling or other injury to the plate. The boxes or tubes themselves form capacious and safe receptacles for active material, which can be put therein in dry state without liability of escape. To strengthen and stiffen these boxes I prefer to line them with strips S of lead or other suitable material. In each box the strip goes down one side, crosses and closes the bottom, and extends up the other side. The projecting ends of these strips can be used for the purpose of connection. The strips themselves not only act mechanically to stiffen the plate, but serve in a measure to accumulate electricity also. The plate at its top and bottom, or either, may have its parts soldered or welded together and to an encircling lead band, as indicated at L in Fig. 1. The active material with which the boxes or tubes formed by the intermeshed wires are filled is indicated at m. The size of wire may vary according to the size of plate and amount of active material required.

Having described my invention and the best way now known to me of carrying the same into effect, I state, in conclusion, that I do not restrict myself to the details herein set forth in illustration of my improvements, for manifestly the same can be considerably varied without departure from the invention; but

What I claim, and desire to secure by Letters Patent, is—

1. A secondary-battery element or plate composed of wires or strips intermeshed or interwoven in the form of a series of connected boxes or tubes, which constitute receptacles for the active material, substantially as and for the purposes hereinbefore set forth.

2. A secondary-battery element or plate composed of wires or strips intermeshed or interwoven in the form of a series of connected boxes or tubes for receiving the active material, and lining and stiffening strips for said tubes, substantially as and for the purposes hereinbefore set forth.

3. A secondary-battery plate or element, the body or frame-work of which is composed of separately-formed coils intermeshed or interwoven to form a series of connected tubes or boxes, substantially as and for the purposes hereinbefore set forth.

In testimony whereof I have hereunto set my hand this 20th day of May, 1890.

THOMAS P. WHITTIER.

Witnesses:
IRENA CAMP,
LUCY C. WHITTIER.